United States Patent [19]
Messina et al.

[11] 3,971,785
[45] July 27, 1976

[54] PROCESS FOR THE MANUFACTURE OF FLOWED-IN AEROSOL CAN GASKETS

[75] Inventors: Thomas A. Messina, Waltham; Patrick J. Droney, Arlington, both of Mass.

[73] Assignee: W. R. Grace & Co., Cambridge, Mass.

[22] Filed: Feb. 13, 1975

[21] Appl. No.: 549,564

Related U.S. Application Data

[63] Continuation of Ser. No. 302,005, Oct. 30, 1972, abandoned.

[52] U.S. Cl. ............................ 264/268; 264/DIG. 59
[51] Int. Cl.² ......................................... B29C 25/00
[58] Field of Search ............. 264/268, 259, DIG. 59, 264/299, 345; 260/75 NH, 77.5 AM, 2.5 AM

[56] References Cited
UNITED STATES PATENTS

| | | |
|---|---|---|
| 3,425,964 | 2/1969 | Stanley ........................ 260/2.5 AM |
| 3,443,006 | 5/1969 | Simons et al. ...................... 264/249 |
| 3,607,837 | 9/1971 | Reegen et al. ............... 260/77.5 AM |
| 3,635,908 | 1/1972 | Vogt et al. .................. 260/77.5 AM |
| 3,834,578 | 9/1974 | Smith et al. .................. 260/2.5 AM |

Primary Examiner—Willard E. Hoag
Attorney, Agent, or Firm—Armand McMillan

[57] ABSTRACT

Process of lining aerosol can valve mounting cups with a gasketing composition comprising a carbon dioxide blocked polyamine dispersed in a liquid polyurethane prepolymer consisting of a free isocyanate group-containing reaction product of a polyisocyanate compound with a polyhydroxy material. The lined cups are heated for a few minutes to gel the gasket and full cure subsequently takes place without further intervention by means of ambient atmospheric moisture. The process is rapid, economical in equipment and produces gaskets which permit a significant extension of swaging specifications.

4 Claims, 3 Drawing Figures

PROCESS FOR THE MANUFACTURE OF FLOWED-IN AEROSOL CAN GASKETS

This is a continuation of application Ser. No. 302,005 filed Oct. 30, 1972 and now abandoned.

THE PRIOR ART

Pressurized aerosol containers are widely used for packaging and dispensing an ever larger variety of materials. In this type of application, the product to be dispensed is confined under pressure by means of a volatile propellant and is discharged in a controlled manner through a valve-actuated orifice. A typical aerosol unit comprises a hollow cylindrical container closed at one end and provided with an opening at its opposite end for receiving a dispensing valve assembly. A metal fitment or mounting cup serves as a closure for the container and also as a support for the valve assembly which is tightly fitted within an aperture centrally located in the cup.

The cup is swaged into the 1-inch standard opening of the aerosol can to produce a container that can safely withstand the internal pressure of the finished package and yet allows the convenient dispensing of the contents when the valve is actuated. An elastomeric sealing material, formed into a gasket by high speed deposition into the annular channel of the mounting cup, compensates for the failure of the metal cup and can to mate perfectly at their juncture. The imperfect metal to metal juncture is the normal result of tolerances, in parts and in swaging process, which must be accepted in the production of an economically feasible aerosol package. Both the manufacturer of cup, valve and can and the aerosol packager who fills and swages the cup into the can must operate within certain allowable tolerances in order that a functional package be produced. In the swaging operation, the parameters of interest are known as crimping dimensions and specified as crimp depth and crimp diameter.

It has been found that the use of a polyurethane composition containing a polyamine carbamate, as the material for the sealing gaskets, has extended the allowable limits of the crimping dimensions beyond those permissible with conventional aerosol mounting cup systems such as the polychloroprene compositions described in U.S. Pat. No. 3,389,113.

The use of polyurethane gaskets per se in aerosol cans was first claimed by Siebel in British patent specification No. 1,203,384 in Oct. 1970. However, the practical problems associated with the high speed placement of gaskets into very large numbers of aerosol mounting cups have effectively kept this type of material from the industrial scene. Part of the reason for this lies in the alternative of using an active curing agent such as a polyamine, or omitting the curing agent and allowing the gasketing material to cure by means of ambient moisture. In the first instance, the inconvenience of a two-package system effectively discourages the cup manufacturer, while in the second instance relatively long cure times of 60 hours or more are needed, causing the accumulation of very large numbers of cups "in process" and thus increasing the requirements for equipment as well as the delay of quality control procedures which must be carried out on the gelled gaskets.

Furthermore, while carbon dioxide-blocked polyamines (carbamates) have been used as curing agents for polyurethane prepolymers to permit the formulation of stable one-package compositions that can be heat activated as desired, the potential advantages of such systems in aerosol mounting cup flowed-in gasket applications have remained largely unexplored. This state of affairs is perhaps due in part to the preponderant selection of diamine carbamates for curing linear polyurethanes destined to the production of filaments, and also in part to the undesirable release of carbon dioxide on heating. In any event, applicants have now discovered unexpected advantages, such as the extension of swaging tolerances already mentioned, in the use of certain polyurethane compositions for aerosol gasketing. These advantages, as well as others, will be fully described in the following disclosure.

SUMMARY OF THE INVENTION

According to the present invention, it has now become both possible and desirable to line aerosol can mounting cups with exceptional gaskets by a process which involves (1) the high speed placement into the annular channel of the cups of a stable one-package composition comprising a free-isocyanate group-containing reaction product of a polyhydroxy material with a polyisocyanate and a finely divided carbamate which is a carbon dioxide-blocked polyamine, (2) the heating of the flowed-in composition for a few minutes at the decomposition temperature of the carbamate to cause the gelling of the gasket material, (3) the subsequent curing of the gelled gasket material by ambient moisture during shipment to the aerosol packager, and (4) the swaging of the lined cups to the body of aerosol cans after the latter have been filled with the product to be dispensed.

The carbamate gelled, ambient moisture curing polyurethane aerosol cup gasketing system of the invention provides for, as shall be demonstrated, a substantial widening of allowable tolerances of crimping dimensions beyond those currently permitted in such an assembly, and a means of rapidly bringing a liquid prepolymer resin gasketing compound to a gelled and partially cured state sufficient so that the production quality of resulting gasket-cup assemblies can be observed within 5 minutes of the compound placement.

DESCRIPTION OF THE DRAWINGS

The present invention will be more clearly understood on reference to the accompanying drawing and the discussion relating thereto:

Referring to FIG. 1, a typical aerosol container is illustrated which comprises a cylindrical body portion 10 fitted with a domed top portion 12 and a bottom closure 11. The container is provided with a metering valve generally designated at 13 which is actuated by button 15. The actuator button is carried on a hollow valve stem 14 and provided with an orifice 16 through which the container contents are discharged when valve 13 is opened. Communicating with valve 13 is a dip tube 17 of sufficient length to allow the contents to be discharged from the container. The valve unit, which may be any of the various types known to the art, is supported by a mounting cup, generally designated at 18, which is adapted to receive the valve stem 14. The mounting cup also serves as a closure for the container and carries the sealing gasket in the annular channel 22 which is applied over the opening in the domed top portion 12 of the container.

Figure 1:
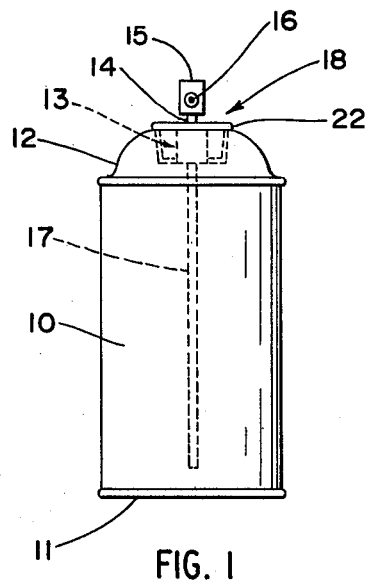
FIG. 1 is a side elevational view of a typical aerosol container provided with a mounting cup and valve unit.
Figure 2:
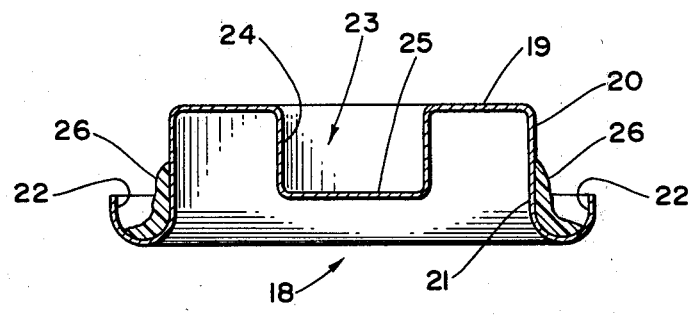
FIG. 2 is an axial sectional view of the aerosol mounting cup of FIG. 1 carrying a gasket perpared from compositions of the present invention.

An axial sectional view of mounting cup 18 is shown in FIG. 2 in inverted position relative to its placement in the assembled container. The cup comprises a circular panel 19 having an integral skirt 20 depending from its periphery. The free edge of skirt 20 outwardly flanged at 21 to form an annular gasket-receiving channel 22. The inner portion of panel 19 is countersunk to form a tubular recess, generally designated at 23, which has a dependent circular wall 24 integrally joined with an apertured horizontal wall 25. When the cup is placed in sealing position, the tubular recess 23 acts as a pedestal for the valve unit and the valve stem is admitted into the container through apertured wall 25. The gasket 26 is disposed predominantly in the annular channel 22 of the cup.

Figure 3:
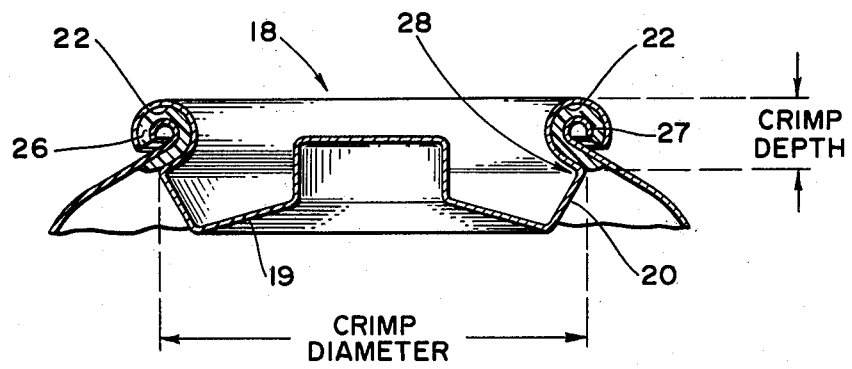
FIG. 3 is a fragmentary axial sectional view of the upper portion of the aerosol container of FIG. 1 showing the gasketed mounting cup of FIG. 2 crimped in position over the mouth of the container.

FIG. 3 shows the gasketed mounting cup of FIG. 2 crimped in position over the mouth of an aerosol container. As illustrated in FIG. 3, the open end of domed portion 12 of the container is provided with an outwardly curled peripheral bead 27 which defines the container mouth. The annular channel 22 of the mounting cup embraces the bead 27 of the container so that the gasket 26 carried by channel 22 is positioned on bead 27. The lower portion of the skirt 20 is flared outwardly against the wall of domed portion 12 adjacent to the bead 27. The gasket forms a seal between the skirt and the wall adjacent to the container mouth. The crimping dimensions as measured from swaged seam 28 are identified on the drawing as the crimp depth and the crimp diameter.

DETAILED DESCRIPTION OF THE INVENTION

The compositions that are used in the process of this invention consist essentially of a low molecular weight polyurethane prepolymer into which there is dispersed a finely divided polyamine carbamate. Fillers, solvent, antioxidants, pigments and other additives for elastomers, which are free from active hydrogen, may be incorporated for the conventional effects. The usable prepolymers are low molecular weight reaction products of polyisocyanates, preferably aromatic or alicyclic, with polyfunctional organic compounds containing active hydrogen, preferably polyhydroxy compounds. If desired, the isocyanate groups of the prepolymer themselves may be blocked, for instance with nonylphenol, to be freed later by heat, for reaction with the polyamine and moisture. The best results have been obtained with mixtures of triols and diols in which triol compounds constitute at least 30% of the total polyhydroxy compound mix weight.

The carbamates employed with the prepolymers are, as already mentioned, the reaction products of polyamines and carbon dioxide under anhydrous conditions. The compounds so prepared are generally stable solid materials which may be pulverized for dispersion into the polyurethane prepolymer or dispersed in an organic non-aqueous inert solvent prior to admixture with said prepolymer. The preferred particle size of the carbamate for mechanical stability of the prepolymer mix and the uniformity of the cured polyurethane mass is such that the powder should pass through a 200 mesh or finer U.S. Bureau of Standards screen. Typical examples of usable carbamates are provided in U.S. Pat. Nos. 3,029,227 and 3,344,175.

In the process of the invention, the annular channel of aerosol mounting cups is lined with the prepolymer-carbamate composition by means of appropriate high speed gasket lining machinery. This operation may proceed at rates of 150 or more cups per minute per lining station. After lining, the cups are routed through an oven in which the gasketing material is subjected to a sufficiently high temperature, e.g. 175°F, to decompose the carbamate into its component polyamine and carbon dioxide. In a matter of minutes, usually 5 or less, the polyamine reacts with the prepolymer and gels it. Surprisingly, the carbon dioxide released does not adversely affect the relatively thick channel-confined aerosol gasket to an undesirable degree. The lined cups can be examined at that point for gasket defects and those acceptable are immediately packed for shipment to the aerosol packager. Complete cure of the gaskets subsequently takes place, without further intervention, through reaction of the polymer with ambient moisture during a period of 3 to 5 days.

The temperature at which the gasketing mixture will gel depends to a certain extent upon the nature of the polyhydroxy compound mix as well as on the decomposition point of the carbamate. Thus, although a temperature within the range of 150° to 300°F or higher can be used, gelling can generally be effected in about 2 minutes at temperatures under 200°F.

One of the principal advantages of this method of lining cups over conventional methods lies in the early possibility of examining the cups for satisfactory lining. With a conventional aerosol gasketing system such as one based on polychloroprene for instance, a 5 to 6 hour curing cycle is required involving various stages of drying and curing in a convection type drying and curing oven. Thus, in order to produce gasketed mounting cups at high rates, the drying and curing process must be of exceptionally large capacity and, furthermore, the final production results cannot be fulled observed until tens of thousands of units or more have become involved. In such circumstances defects in composition or mechanical performance may be quite costly. With this in mind, it can readily be understood that the ability to evaluate the quality of the final product after only five minutes is a great improvement over the 5 or 6 hours processing delay normally experienced.

The process of the invention can be further advantageously characterized by a great reduction, if not complete elimination, of the quantity of solvents and other volatile products usually associated with gasketing compositions. A conventional polychloroprene composition, for instance, can contain up to 60% by weight of high boiling aromatic solvent, not to mention various additives such as plasticizers, curing agents and the like which either must be removed during the drying or are partly entrained or decomposed to noxious substances during the extended drying and curing process.

Subject to the preferences already expressed in terms of prepolymers, i.e. partial reaction products of cyclic diisocyanates with mixtures of diols and triols, such as polyalkylene glycols and polyhydroxy polyethers, there may be used other polyisocyanates and polyhydroxy compounds to achieve useful, if not optimum properties in the gaskets.

Among the polyisocyanates that may be employed in this manner are: the various unsubstituted phenylene diisocyanates, as well as those having one or more substituents such as methyl and other lower alkyl groups having up to about 4 carbon atoms, halogen atoms, nitro groups, alkoxy and aryloxy groups; various substituted and unsubstituted biphenylene diisocyanates; substituted and unsubstituted diphenyl diisocyanates such as the diphenylmethanes-, the diphenylisopropylidenes- and the diphenylsulfone diisocyanates; the naphthalene diisocyanates; alkylene diisocyanates containing up to about ten alkylene carbon atoms; cycloalkyl diisocyanates containing one or more cycloalkane rings such as 1,3-cyclopentene- and 4,4'-dicyclohexylmethane diisocyanate; and other diisocyanates such as 1-ethyleneisocyanato-4-phenyl-isocyanate. Examples of tri- and tetra- isocyanates that may be used include the benzene and toluene triisocyanates, 2-methyl-2-(4-isocyanatophenyl)-trimethylene diisocyanate, tetrakis-(4-isocyanatophenyl)methane and bis-(4-methyl-2,5-isocyanatophenyl) methane. Polymeric materials such as polymethylene polyphenylisocyanate may also be employed.

Suitable compounds that will react with the above isocyanates to yield the necessary prepolymers include polyols such as ethylene glycol, glycerol, pentaerythrytol, sorbitol, triethanolamine, as well as polymeric compounds such as polyglycols, polyhydroxy polyesters, polyhydroxy polyesteramides and polyhydroxy polyether oils.

Typical polyglycols include polyalkylene glycols, such as polyethylene glycol, polypropylene glycol, and polybutylene glycol.

Representative polyesters are reaction products of dihydric alcohols, such as ethylene glycol, diethylene glycol, tetraethylene glycol, 1,3-propylene glycol, dipropylene glycol, or higher polyhydric alcohols such as glycerol, trimethylol propane, pentaerythritol, mannitol, or mixtures of two or more of the alcohols with a polycarboxylic acid or anhydride such as succinic, adipic, glutaric, maloric, sebacic, azelaic, phthalic, terephthalic, isophthalic, trimellitic and pyromellitic acids and their anhydrides. Mixtures of the acids and anhydrides can be employed.

Illustrative polyhydroxy polyesteramides are the reaction products of a polyhydric alcohol with a dicarboxylic acid, examples of both of which have been mentioned above, and as necessary, diamines or aminoalcohols such as ethylene diamine, hexamethylene diamine, phenylene diamine, benzidine and monoethanolamine.

Examples of polyhydroxy polyethers include linear hydroxyl-containing polymers and copolymers of cyclic ethers such as ethylene oxide, epichlorohydrin, 1,2-propylene oxide, oxacyclobutane, and tetrahydrofuran, or branched polyethers obtained from the condensation of the aforementioned ethers with branched polyhydroxy compounds such as glycerol, 1,1-trimethylolpropane, pentaerythritol, sorbitol and sucrose. Mixtures of linear and branched polyethers or mixtures of polyesters and polyethers can also be employed.

Other polyhydroxy materials, for example, esters of hydroxycarboxylic acids, such as castor oil and glyceryl monoricinoleate, can also be used.

The solid polyurethane polyurea which results from the curing of the sealing compositions of interest may be crosslinked to any degree desired, depending on the number of functional groups present and the ratio of amino groups to isocyanate groups.

Satisfactory crosslinking of the polymers used in this invention is generally achieved with a carbamate to terminal insocyanate group chemical equivalent ratio of, for instance 0.5:1. These proportions may also vary more broadly depending on the particular nature of the components used and the degree of crosslinking required by the application intended for resulting polymer. Thus, ratios of 0.2:1 to 1.3:1 have been sucessfully employed with various formulations.

The compositions of the invention will generally contain a solvent to facilitate handling of the prepolymer mix by gasket-laying machinery. Usable solvents are organic liquids that do not possess any active hydrogen to react with the isocyanate groups of the polymer and are capable of either evaporating under process conditions or acting as plasticizers when left in the gasket. Examples of suitable liquids for this purpose include: aromatic hydrocarbons, such as benzene, toluene and xylene; acetic esters, such as ethyl and butyl acetates; chlorinated aromatic and aliphatic solvents, such as monochlorobenzene and carbon tetrachloride; ethers, such as butyl ethyl ether, dioxane and hydrofuran; and ethylene glycol monomethyl ether acetate. Solvents having active hydrogen such as the lower alcohols, may be used to prepare the carbamate, but they must be removed from the dispersion before it is mixed with the prepolymer. Relatively small quantities of solvent are needed for the gasketing compositions used in the process of the invention due to the liquid nature of the prepolymer. Thus, less than 10% by weight is generally sufficient. As a result, the pollution problem created during the drying of conventionally lined mounting cups as well as the precautionary equipment required to solve that problem are either minimized or eliminated. The latter advantage is fully realized when the solvent or diluting liquid selected doubles as a plasticizers and thus need not be removed from the composition. Certain high boiling esters, such as dioctyl and diisodecyl phthalate and the like, serve well in this capacity.

As fillers, there may be used, for example, calcium carbonate, calcium silicate, aluminum silicate, silica, chrysolite asbestos, carbon black, titanium dioxide, fully calcined clays and talcum powder. The latter material is preferred.

The following examples are provided to further illustrate the invention. All parts and percentages therein are on a weight basis, unless otherwise specified.

EXAMPLE 1

A stable prepolymer-carbamate composition is prepared from the following ingredients:

| Component | Parts by Weight |
| --- | --- |
| Poly(oxypropylene)glycol, mol. weight 2,000 (POPS) | 5.8 |
| Poly(oxypropylene)triol, mol. weight 4,000 (POPT) | 35.4 |
| Tolylene diisocyanate (TDI) | 5.7 |
| Talc | 39.9 |
| Diethylenetriamine carbamate (DETAC), 33% solids | 5.7 |
| Xylene | 6.4 |
| Silicone Oil | 1.1 |
| | 100.0 |

The hydroxy compounds, POPG and POPT, and the talc are first mixed in a steam-jacketed glass lined reactor. The mix is heated to 100°C and the reactor evacuated to remove water. After complete removal of the water, the batch is cooled to 50°C and the xylene is charged and mixed. TDI is then introduced while the reactor is brought to 80°C. The reaction is carried on at that temperature until the isocyanate content of the prepolymer mixture reaches 2.9%. The reaction product is then cooled to 30°C and the DETAC dispersion in e.g. xylene, as well as the silicone oil, are mixed in to complete the batch.

EXAMPLE 2

The liquid compound prepared according to Example 1 is applied at the rate of about 300 mg solid basis per cup to aerosol valve mounting cups by conventional aerosol gasketing equipment. Production rate for this operation is about 200 cups per minute per application nozzle. After the liquid has been applied to the cups, the latter are transferred by automatic belt feed mechanism to a small capacity oven for the gelling cycle. A "baby" size or "half" size Hurricane oven suffices for this operation. The gelling cycle on the moving belt through the oven lasts two minutes at 160°F for the compound of Example 1. The cups are immediately packaged in shipping boxes. Full cure then takes place through ambient atmospheric moisture within 5 days.

EXAMPLE 3

To measure the effectiveness of sealing and swaging of the aerosol mounting cups on aerosol cans, tests were carried out on a commercial aerosol filling line with a number of different aerosol cup sealing gaskets. The history of loss of volatile contents of the test cans was recorded and the number of cans which failed to seal was noted.

The test was made at various crimping and swaging conditions, i.e. by varying the crimp diameter and the crimp depth (see FIG. 3 of the drawing). In the following table, the results of a test of cups made with the composition of Example 1 are compared to those of cups made with a polychloroprene compound such as that of Example 3 of U.S. Pat. No. 3,389,113 cured in the conventional manner.

| Crimping Condition | Gasket Compound | |
|---|---|---|
| | Polychloroprene | Carbamate Gelled/Ambient Cure Polyurethane |
| I. Crimp Depth — 0.160 inches | | |
| | 0% | 0% |
| Crimp Diameter 1.054 inches | | |
| II. Crimp Depth — 0.205 inches | | |
| Crimp Diameter — 1.068 inches | 14% | 2% |

Crimping condition I represents the optimum target conditions presently required to yield 100 percent satisfactory sealing. In this instance, both gaskets performed well. However, maintaining these optimum crimping conditions during high speed filling and sealing of aerosol cans is not always practical and thus some deviation always occurs yielding some cans which are not as tightly sealed as in condition I. These cans belong to crimping condition II. At this condition, the conventional gasket fails to seal more frequently than the carbamate gelled/ambient cure polyurethane aerosol cup gasket. This reduction in failing cans from 14% to 2% represents a significant improvement in sealing effectiveness and reduces the present rate for discarded and scrapped aerosol cans which leak through the crimped seam between the valve mounting cup and can.

EXAMPLES 4 TO 7

Other prepolymer-carbamate compositions were prepared for testing as in Example 3. These compositions generally comprised: about 40% of polyhydroxy compounds in various diol to polyol mix ratios; about 6 to 8% polyisocyanate, in these instances—dicyclohexylmethane diisocyanate; about 38% talc; about 5.5 to 6.0% carbamate (DETAC); about 4.5% xylene; and about 1.2% silicone oil. Some of the polyhydroxy compound mixes selected were as follows:

| Polyhydroxy Compound | Polyhydroxy Compound Mixtures Example 4 | 5 | 6 | 7 |
|---|---|---|---|---|
| Poly(oxypropylene)glycol, 2000* | 3.59 | 3.76 | 22.85 | 5.26 |
| Poly(oxypropylene)glycol terminated with ethylene oxide, 4000 | | 15.63 | | 21.87 |
| Poly(oxytetramethylene)glycol, 3000 | 1.76 | | | |
| Poly(oxypropylene)triol, 3000 | 9.57 | 24.53 | | |
| Poly(oxypropylene)triol, 4000 | | | 4.94 | 16.20 |
| Poly(oxypropylene)triol terminated with ethylene oxide, 6000 | 29.06 | | 14.99 | |
| Total Weight Percent | 43.98 | 43.92 | 42.78 | 43.33 |

*molecular weight

After application to mounting cups and curing, the cups were swaged onto filled aerosol cans under the two crimping conditions of Example 3. Leakage tests again showed a significant improvement in sealing as compared to the conventional polychloroprene system.

In summary, the present invention relates to an aerosol gasketing system which not only benefits from the processing ease attending stable one-package fast-curing polyurethanes, but also performs in a superior manner under the type of conditions generally availing in that field of packaging. Although a limited number of examples have been provided here to illustrate various operational features of the invention, it is apparent that the man skilled in the art can devise several other embodiments which will be substantially within the scope of the invention as described in the appended claims.

What is claimed is:

1. A method for lining an aerosol can mounting cup with a sealing gasket consisting of:
   a. depositing in the annular channel of the mounting cup a layer of a composition comprising (1) a liquid prepolymer of a free isocyanate groups-containing reaction product of a polyisocyanate with a polyhydroxy compound and (2) a finely divided carbon dioxide blocked polyamine;
   b. heating the cup and said composition deposited therein to a temperature sufficient to cause decomposition of said polyamine with time, but said heating being for a time sufficient to gel said composition only and insufficient to cause substantial decomposition of said polyamine; and
   c. then allowing said composition to cure further at ambient temperature in an atmosphere containing moisture.

2. The method of claim 1 wherein said heating temperature is under 200°F and said heating time is about 2 minutes.

3. The method of claim 1 wherein the polyhydroxy compound is a mixture of at least one diol and one triol, said triol constituting at least 30% of the mixture by weight.

4. The method of claim 1 wherein the polyamine is a triamine and the polyisocyanate is aromatic or alicyclic.

* * * * *